United States Patent [19]

Bejtlich

[11] 3,963,234

[45] June 15, 1976

[54] SKI CLAMPING APPARATUS

[76] Inventor: Leonard M. Bejtlich, 4 Martha Lane, Lenox, Mass. 01240

[22] Filed: Feb. 4, 1975

[21] Appl. No.: 546,870

[52] U.S. Cl. ............................ 269/296; 269/321 W

[51] Int. Cl.² ............................ B23Q 3/00

[58] Field of Search ............ 269/40, 134, 288, 296, 269/321 W; 51/228; 76/83; 280/11.37 C, 11.37 T, 11.37 K, 11.37 R; 73/133 A

[56] References Cited

UNITED STATES PATENTS

| | | | |
|---|---|---|---|
| 2,384,850 | 9/1945 | Poor | 280/11.37 C |
| 2,581,824 | 1/1952 | Windahl | 280/11.37 C |
| 2,919,032 | 12/1959 | Sinawski | 280/11.37 K |
| 3,330,573 | 7/1967 | Sieloff | 280/11.37 K |
| 3,642,269 | 2/1972 | Ladd | 269/40 |
| 3,714,803 | 2/1973 | Chenenko | 280/11.37 K |
| 3,719,008 | 3/1973 | Mayers | 51/228 |
| 3,746,355 | 7/1973 | Holley | 280/11.37 T |
| 3,778,048 | 12/1973 | Szohatsky | 269/321 W |
| 3,826,482 | 7/1974 | Tourangeau | 269/321 W |
| 3,834,250 | 9/1974 | Fonas | 280/11.37 T |

FOREIGN PATENTS OR APPLICATIONS

| | | | |
|---|---|---|---|
| 1,335,767 | 7/1963 | France | 280/11.37 K |

*Primary Examiner*—Al Lawrence Smith
*Assistant Examiner*—Robert C. Watson

[57] ABSTRACT

A ski clamping apparatus for holding a ski in position to facilitate waxing and maintenance operations thereon. The apparatus includes an oblong support base having a pair of ski-supporting blocks projecting from the ends thereof and a ski latching mechanism pivotally mounted adjacent its mid-point. The ski latching mechanism is operable to engage a ski binding when a ski is laid on the ski-supporting blocks and manually forced toward the latching mechanism. The latching mechanism quickly secures the ski in a fixed position relative to the support base to simplify desired maintenance operations.

16 Claims, 9 Drawing Figures

SKI CLAMPING APPARATUS

BACKGROUND OF THE INVENTION

The invention relates to ski maintenance apparatus and in particular to a ski clamping apparatus for supporting skis of either the cross-country of Alpine type in a convenient position for waxing, scraping or otherwise maintaining their sliding surfaces.

Those familiar with the sport of skiing have long recognized the need to continuously maintain the condition of their skis by scraping or otherwise smoothing the bottom gliding surfaces and applying suitable waxes to enable optimum sliding conditions on various types of snow. In the past, a wide variety of different types of ski maintenance equipments have been developed to aid skiers in expeditiously performing such necessary maintenance tasks. One example of a relatively recent form of such ski maintenance apparatus is disclosed in U.S. Pat. No. 3,719,008--Mayers. The Mayers patent teaches the use of a portable ski clamping support base that employs a plurality of blocks mounted on the base to hold a pair of Alpine type skis adjacent to the base. This holding means is simplified by utilizing the resilient camber of the skis to interact with the blocks mounted on the support base in a predetermined manner to clamp the skis in a desired position. The Mayers apparatus is useful both in sharpening the metal edges of such skis and in providing a working surface to enable a skier to dress the sliding surface of his skis by scraping and waxing them.

While the type of portable ski maintenance apparatus shown by the Mayers patent has numerous advantages and, consequently, has enjoyed considerable commercial success, it has been found that it is frequently desirable to secure a ski in a relatively more rigid position on a support base when the ski is being scraped and waxed than is possible with the Mayers type of support alone.

Various prior art devices, such as the one disclosed in the Mayers patent, have provided means for holding skis in a generally fixed position while the sides of the cutting edges of the skis are being filed; however, those devices fail to provide convenient means for securing the skis in a relatively rigid position when the bottom surfaces of the skis are to be scraped, waxed, etc. Of course, with an apparatus such as that disclosed in the Mayers patent, it is possible for a skier to manually hold a ski in position against the supporting blocks on its support base, but if that is done a further disadvantage exists. This second disadvantage arises due to the fact that when a ski is manually held against the supporting blocks of such a ski clamping support, the ski is likely to bend beyond its normal camber when scraping or waxing operations are performed on the bottom surface of the ski. Such bending causes the ski to be depressed below the upwardly protruding surfaces of the intermediate blocks that are positioned on the Mayers clamping apparatus to hold the skis against their camber during sharpening operations. If this type of flexing occurs, either the skier's hand, or his scraping tools will tend to strike against the intermediate blocks, thus causing injury to either the skier or the block means, or at a minimum causing the skier to lose control of the scraper or wax spreader.

A major object of the present invention is to provide a portable ski clamping apparatus that affords the advantages of related prior art apparatus, such as that disclosed in the above-referenced Mayers patent, while at the same time overcoming disadvantages of prior art apparatus such as those enumerated above.

Another object of the invention is to provide a ski clamping apparatus having rugged, inexpensive and easily operable latching means that are effective to quickly secure either an Alpine type or a cross country type of ski in position thereon to facilitate maintenance operations on the sliding surface of the ski.

Yet another object of the invention is to provide an improved latching means useful with the type of portable ski maintenance apparatus disclosed in the abovementioned Mayers patent so that the bottom gliding surface of skis can be quickly and conveniently secured in a relatively fixed position in a plane above the intermediate block means of the apparatus, so that a skier can work on the bottom ski surface without being concerned about the ski flexing to a position such that his hand or his tools might strike the immediate block means.

Additional objects and advantages of the invention will become apparent from the description of it that follows taken in connection with the accompanying drawings.

SUMMARY OF THE INVENTION

In one preferred embodiment of the invention a ski clamping apparatus having a rigid support base with a pair of ski-supporting blocks mounted thereon is provided with a manually pivotable latching mechanism that is operable to quickly secure a ski snuggly against the ski-supporting blocks so the ski does not bend excessively while normal maintenance operations are performed on it.

BRIEF DESCRIPTION OF THE DRAWINGS

FIG. 1 is a perspective view of a portable ski clamping apparatus constructed according to the present invention and shown in relation to an Alpine type ski positioned in a suitable position thereon to enable the ski surface to be worked on.

FIG. 4 is a perspective view of a preferred alternative embodiment of a ski clamping apparatus having a latching means constructed pursuant to a further teaching of my invention. This embodiment is particularly suitable for use in maintaining skis of the cross country type.

DESCRIPTION OF PREFERRED EMBODIMENTS

Figures 1, 4:
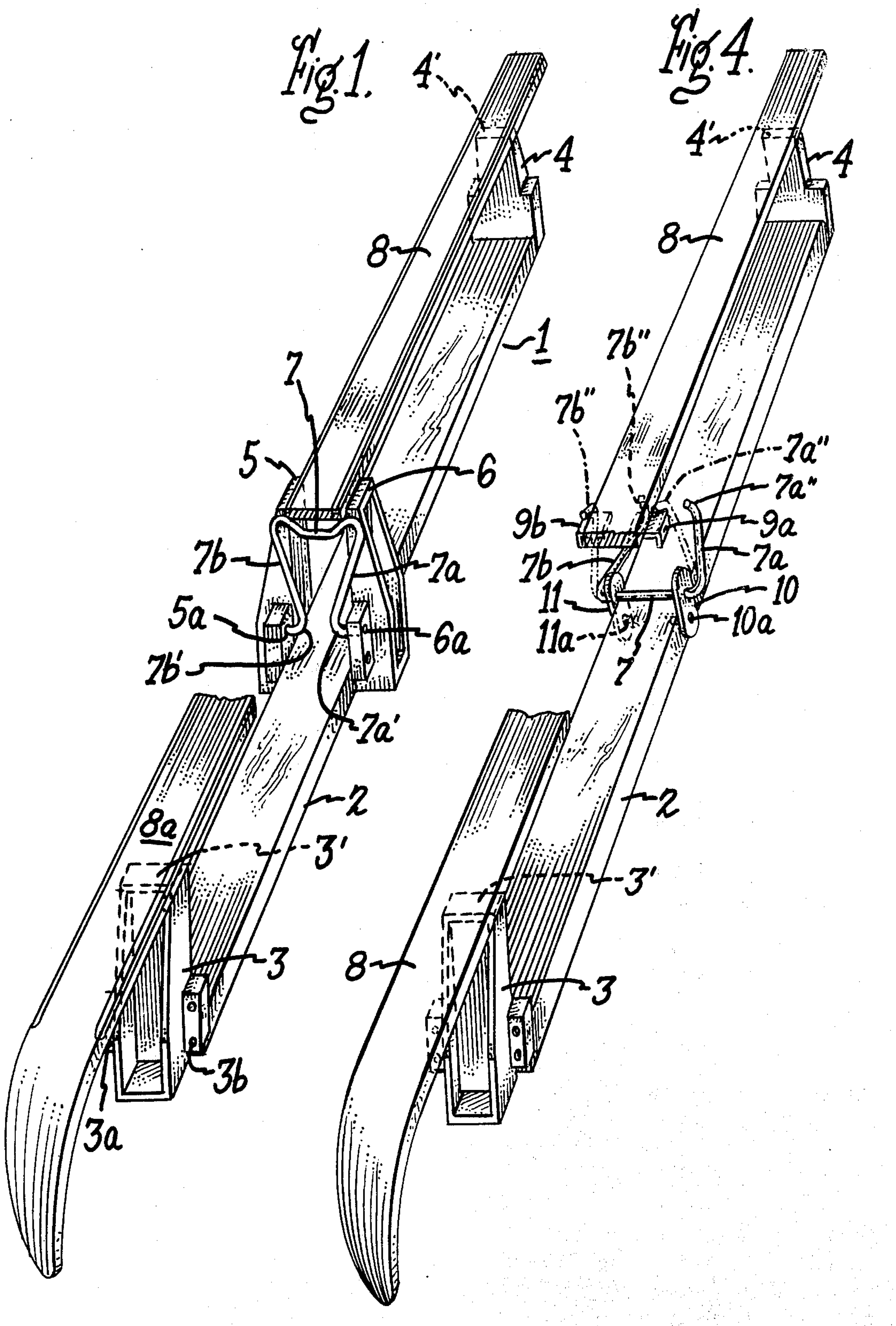

Referring now to FIG. 1 of the drawing, there is shown a preferred embodiment of a ski clamping apparatus 1 for holding either an Alpine type, or a cross country type, ski in position to facilitate scraping and waxing of its sliding surface. In this embodiment of the invention, the apparatus comprises an oblong support base 2 that is formed of lumber or other suitably rigid construction material. A first rigid block 3 and a second block 4 are mounted in fixed positions, respectively, adjacent opposite ends of the support base 2. The blocks 3 and 4 preferably are formed of injection molded plastic material and are each provided with apertures, such as the apertures *3a* and *3b* shown in block 3 in FIG. 1, to provide convenient means for inserting wood screws or other suitable securing means through the blocks to secure them to the support base 2. A second pair of rigid, molded plastic blocks 5 and 6 are similarly mounted on the support base 2 adjacent the midpoint thereof. Those skilled in the art will understand that the blocks 3–6 may be mounted at various relative positions on the support base 2, in the manner described in the above-noted Mayers patent; thus for the purpose of understanding the present invention, it is sufficient to appreciate that the blocks are preferably located generally adjacent the points indicated.

As it has been described thus far, the embodiment of the present invention shown in FIG. 1 is generally similar in structure to the type of portable ski clamping apparatus disclosed in the above-referenced patent to Mayers. Pursuant to the present invention, however, the blocks 5 and 6 are used as brackets, each of which include wall means defining recesses *5a* and *6a* that are formed in the respective inner surfaces thereof and that are each adapted to receive a lug therein in a manner that will be described more fully below. At this point, it should be noted that the recesses 5a and 6a are generally cylindrical in form but may be any other satisfactory shape and need only be ⅛ to ¼ inch in depth for the purposes of the invention. They may be formed during the injection molding operation used to make the blocks 5 and 6, or the recesses *5a* and *6a* may simply be bored in the bracket portion of the blocks after they are otherwise fabricated, as is the case in the embodiment disclosed here.

Figure 2:
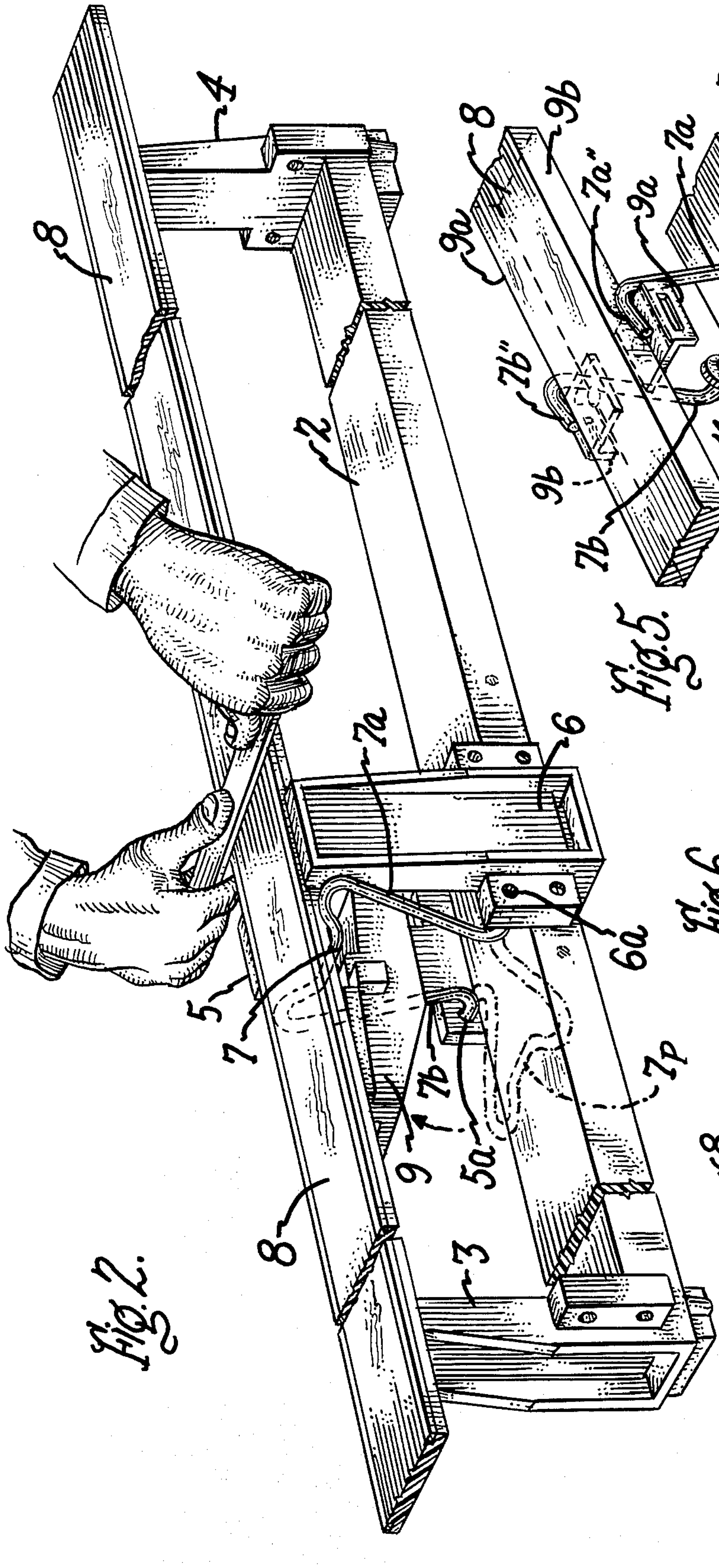
FIG. 2 is an enlarged, fragmentary perspective view of the embodiment of the invention illustrated in FIG. 1 showing the latching means of the invention arranged in its latched position relative to the ski positioned on the clamping apparatus.
Figure 3:
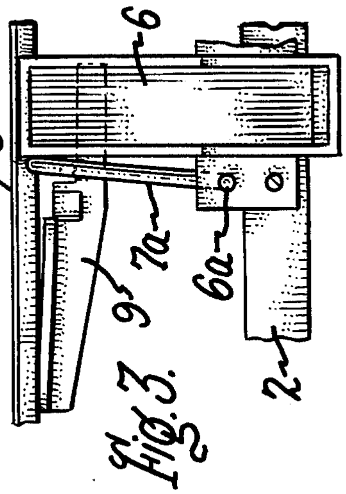
FIG. 3 is a side plan view of a portion of the clamping apparatus and ski shown in FIGS. 1 and 2, showing the latching mechanism of the invention in its latching position.

Further, in accordance with the present invention, a generally U-shaped latching member 7 is provided having an integral pair of legs *7a* and *7b* with a pair of lugs *7a'* and *7b'*, respectively, extending outward from the outer ends thereof in substantially the same plane occupied by the legs. In the assembled position of the U-shaped latcing means 7 of the invention shown in FIGS. 1 and 2, the lugs *7a'* and *7b'* are positioned, respectively, in the recesses *6a* and *5a* of the bracket blocks 6 and 5. It will be understood that the lugs are pivotally mounted in the recesses *5a* and *6a* so that the cross-bar portion of the U-shaped latching means 7 can move from a first position adjacent the support base 2, as seen in phantom and designated 7P in FIG. 2, to a second position where it is operable to engage or latch a ski or a binding on a ski, as shown in FIG. 1 and in solid outline in FIG. 2. It should be appreciated that, according to the principle of the invention, the latching means 7 operates as an over-center device. Consequently, when it is moved from the first position (7P in FIG. 2) to the second position adjacent blocks 5 and 6, and a ski, such as the ski 8 shown in FIG. 1, is laid on the generally flat ski supporting surfaces 3' and 4' of the blocks 3 and 4, the mid portion of the ski 8 will hold the latching means 7 against the blocks 5 and 6. Thus, a downward force on the bottom surface *8a* of ski 8 will not cause the latching means 7 to move downward past the block 6 toward the support base 2. The member 7 act as a strut in compression to hold the ski in a fixed position, as best seen in FIG. 3. It will be noted that the outer parts of the cross bar portion of latching member 7 engage the top surface of ski 8, as shown in FIG. 3, while the center part of the cross bar portion is formed to engage the binding 9 to latch the ski snuggly against blocks 3 and 4. To accomplish this optimum latching mode, the center part of the cross bar portion of member 7 is preferably in the range of ¼ to ½ inch below a straight line between the upper extremities of the cross bar portion, as seen in FIGS. 1–3. Of course, if a looser fit is acceptable to some skiers, the cross bar portion of member 7 may be substantially straight in alternative embodiments of the invention. Also, other types of ski bindings may require a slightly different configuration of the generally U-shaped member to afford the desired latching effect obtainable with the invention.

To further facilitate this latching action and cause latching means 7 to hold the ski 8 against the support base 2 after it has been initially flexed downward to a position such that it engages the latching means 7, by applying a manual force to the mid-point of the ski, the latching means 7 comprises a relatively thin piece of metal stock, such as a wire-like steel member that is approximately ⅛ inch in diameter in the preferred form of the invention. Thus, the latching means 7 can be readily adapted to engage any suitable portion of a conventional ski binding such as the toe piece 9 of the illustrated binding, best seen in FIG. 2. It will be seen that when the latching means 7 is engaged between the nose piece 9 and the ski 8, it is impossible to raise the ski 8 upward, away from the base 2, until the ski 8 is slid forward relative to the latching means 7 to free the nose piece from the cross bar portion of member 7.

Accordingly, with the preferred embodiment of the invention, it will be appreciated that a ski can be quickly and securely latched in position on the supporting base 2 by simply placing the upper surface of the ski, as shown in FIG. 1, on the generally flat ski-supporting surfaces 3' and 4' of blocks 3 and 4, then applying a manual force to the center of the ski to bend it downward slightly toward the support base 2. When the ski is so positioned, the U-shaped latch member 7 is manually pivoted from its first position adjacent the support base 2 to its second position against blocks 5 and 6 to cause the toe piece 9 to be engaged and latched by the central portion of the latch means 7. At that point, the skier may scrape the bottom surface *8a* of the ski, wax it or otherwise perform conventional maintenance operations, without being further concerned about having to hold the ski to maintain it on the support base 2. Of course, as is generally well known in the art, various suitable means can be employed to hold the support base 2 in any number of different convenient operating positions to further facilitate the performance of such maintenance operations.

A desirable feature of the embodiment of the invention shown in FIGS. 1–3 is that the U-shape latching means 7 can be easily removed from the recesses *5a* and *6a* by simply compressing the legs *7a* and *7b* toward one another sufficiently to allow the lugs *7a'* and *7b'* to clear the recesses. Therefore, if the latching means 7 should be broken or otherwise damaged, it can be quickly and easily replaced. Alternatively, if it is necessary to bend the member 7 to make it latch properly to toe piece 9 as explained above, such work may be aided by taking the member 7 from the brackets 5 and 6.

Another important feature of the invention is that the latching means 7 is operable to prevent a ski (8) from being pulled rearward off the ski supporting surfaces 3', 4' when a draw-bar file is being used to file the bottom surface of the ski cutting edges by applying a rearward (toward block 4) force to the surface 8a of a ski 8, as shown in FIG. 2. This mode of operation is due to the over-center locking abutment of the latch member 7 with blocks 5 and 6, combined with its latching engagement with toe piece 9. It should be noted that the invention is operable in this regard even with skis that use Spademan or Burt type bindings, i.e. a type of bindings that utilize a simple projecting pin or stud (not shown), rather than the boot-sole clamping type of toe piece 9, illustrated in FIG. 1. Such pins or studs on the top surface of a ski (8) would be forced into engagement with the cross bar portion of latch member 7 when a draw bar file forces the ski to slide slightly toward block 4 to bring a Burt-type binding pin against the cross bar portion, which is arrested in its rearward motion by blocks 5 and 6. For use with such pin or stud type binding means, the central portion of the cross bar may be substantially straight, or it may be bent to be about ¼ inch closer to the mouth of the U-shaped member than the base extremities of legs *7a* and *7b*.

The operation of the invention should be generally understood from the foregoing description of its characteristic structural features. In addition to the modes of operation already noted, it will be understood that after a ski is placed in position on surfaces 3', 4' on blocks 3, 4 and latched snuggly thereto by the cross bar portion of latching member 7 being moved to its second position against blocks 5 and 6 and under the binding toe piece 9, the member 7 will act as a strut to support the ski 8 from bending downward when pressure is applied to its bottom surface, as in a scraping operation. Furthermore, the member 7 will act as a tension support, due to its latching engagement with the toe piece, so that the ski will not bounce upward when such a scraping force on the ski is suddenly terminated.

Now, referring to FIG. 4 of the drawing, a second preferred embodiment of the invention will be described. This embodiment has been found particularly suitable for use in dressing cross country type skis, which normally need far more frequent waxing than do Alpine type skis, to accommodate different types of snow and a variety of climbing and running conditions. As shown in FIG. 4, the features of this embodiment of the invention which are substantially similar to those illustrated in the embodiment of the invention depicted in FIG. 1 will be referred to with the same identifying numbers to facilitate a rapid understanding of the second embodiment. It will be seen there is shown an oblong support base 2 formed of wood or similar material having rigidly mounted thereon adjacent the respective opposite ends thereof a pair of injection molded plastic blocks 3 and 4, each of which has generally flat ski-supporting surfaces 3' and 4', respectively, positioned above the upper surface of the base 2. Rather than utilizing intermediate blocks, such as the blocks 5 and 6 shown in FIG. 1, a pair of mounting eyes 10 and 11 are rigidly mounted on opposite sides of the support base 2. The mounting eyes may be of any conventional type, but in the embodiment being described they are made of steel stock having two spaced-apart apertures stamped, bored or otherwise suitably formed therethrough. Each of the mounting eyes has positioned through one of its apertures a portion of the mid-part of a resilient steel, U-shaped latching member 7 to thereby secure the latching member for pivotal movement relative to the support base 2. It will be understood that various means may be used to secure the mounting eyes 10 and 11 to the support base 2, but in the preferred embodiment of the invention the mounting eyes 10 and 11 are secured to the base 2 by having screws 10a and 11a (also shown in FIGS. 5 and 6) inserted through the second apertures therein, and screwed into the base 2. During the assembly of the U-shaped latching means 7, the mounting eyes may be threaded over the ends of the U-shaped member 7 before the eyes are rigidly screwed in position on the support base 2, in the manner just described.

It is desirable, as is the case with the preferred embodiment being described, to mount the eyes 10 and 11 so that they are pivotable about their securing means, such as screws 10a and 11a. The reason for such pivotal mounting is to enable the latching member to twist slightly relative to the longitudinal axis of base 2 in a manner that will enable its lug means (described below) to more securely engage a ski binding of a typical cross-country type, as will be more fully explained later with reference to FIG. 5.

This second embodiment of the invention differs from that shown in FIG. 1, because although the U-shaped latching means 7 has a pair of legs *7a* and *7b* similar to those shown in FIG. 1, the lugs *7a''* and *7b''* positioned on the outer ends of the embodiment shown in FIG. 4 extend in a direction that is generally perpendicular to the plane occupied by the legs, rather than being substantially in alignment with that plane. When the latching means 7 moves from the first position in which it is shown in solid outline in FIG. 4 to a second position (as seen in FIGS. 5 and 6, and in phantom (7P) in FIG. 4) wherein the lugs *7a''* and *7b''* slide, respectively, over the parts of a cross country type ski binding *9a* and *9b* extending beyond the sides of the ski, the lugs will hold the ski 8 snuggly against the supporting surfaces 3' and 4' of blocks 3 and 4.

Figure 5:
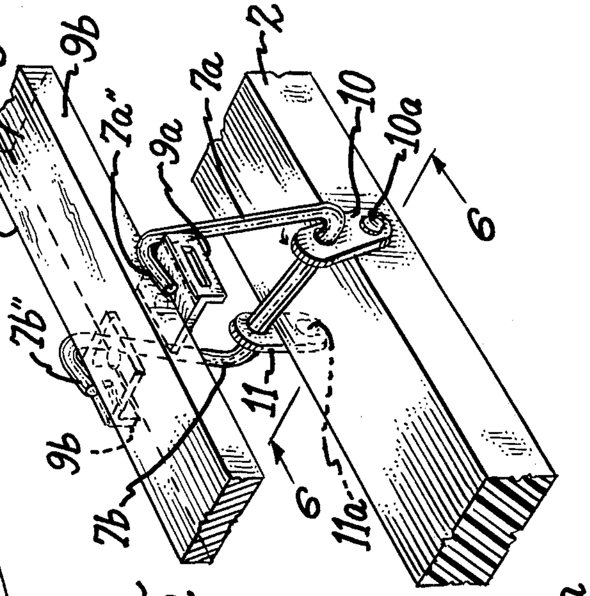
FIG. 5 is an enlarged, fragmentary perspective view of the clamping apparatus and ski shown in FIG. 4, with the latching mechanism in its latched position.
Figure 6:
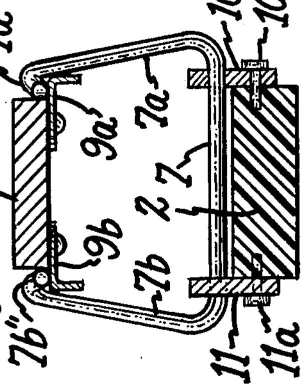
FIG. 6 is a plan view, partly in cross-section taken along the plane 6—6 shown in FIG. 5.

Actually, in the preferred embodiment of the invention shown in FIGS. 4–6, the lugs *7a''* and *7b''* extend from the outer ends of the legs *7a* and *7b* of U-shaped member 7 in a direction generally perpendicular to the plane occupied by the legs but at an angle to that plane of approximately 70°, as best seen in FIG. 5, so that when the latching means 7 is moved to its second position, i.e. with the legs about vertical to base 2, the outermost ends of the lugs *7a''* and *7b''* hook slightly downward to insure the desired latching engagement of the ski 8 against the blocks 3 and 4. It has been found that by using such a 70° angle to the lugs *7a''* and *7b''* when the ski 8 is forced slightly toward block 4 after member 7 is latched, the ski is more firmly and securely held in position.

As best seen in FIG. 5, it is common practice to mount toe plates, such as the plates *9a* and *9b* shown on ski 8 so that they are slightly staggered longitudinally, that is so that one of the plates is slightly forward of the other, rather than positioning the plates 9*a* and 9*b* directly across from one another. As shown in FIG. 5, the toe plate 9*a* is mounted slightly forward of plate 9*b*. To accommodate such staggering, the mounting eyes 10 and 11 are pivotal on screws 10*a* and 11*a*, so that eye 10 can pivot slightly forward, and eye 11 slightly rearward, as seen in FIG. 5. This kind of movement allows the cross bar of latching member 7 to twist slightly relative to the longitudinal axis of base 2, thereby enabling the lug 7*a''* to fully engage the toe piece 9*a*, while the lug 7*b''* is fully engaged with the toe piece 9*b*.

Figure 7:
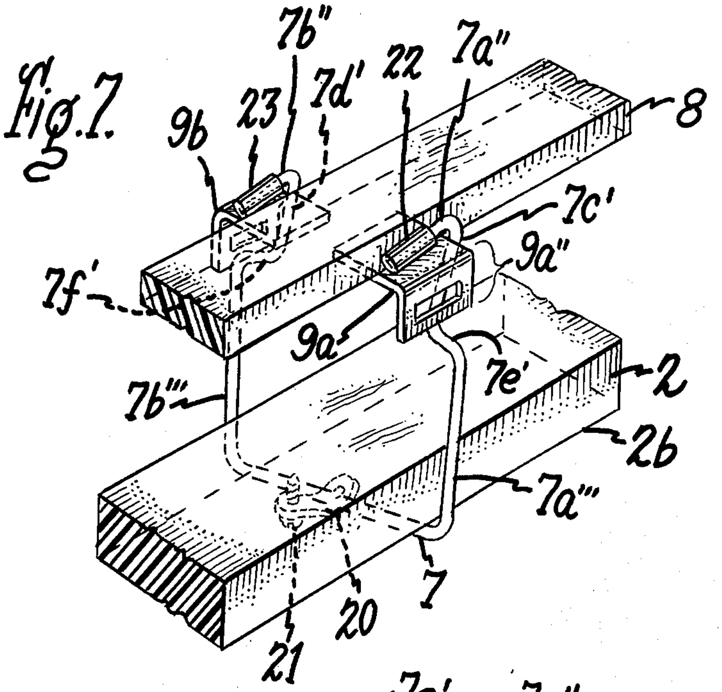
FIG. 7 is a fragmentary, perspective view of a further preferred embodiment of a ski clamping apparatus having a latching means constructed pursuant to the invention. A section of a support base having a latching means is shown in relation to a ski secured thereto.
Figure 8:
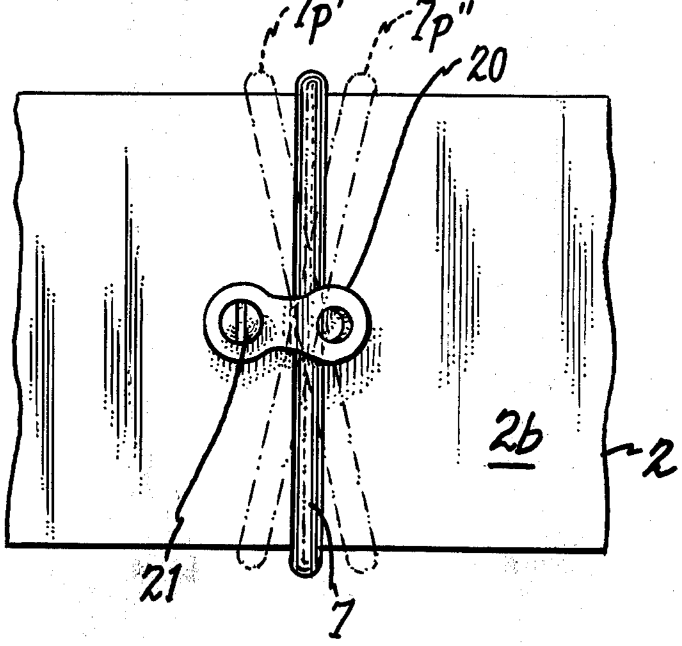
FIG. 8 is a fragmentary bottom plan view of the support base and part of the latching means shown in FIG. 7.
Figure 9:
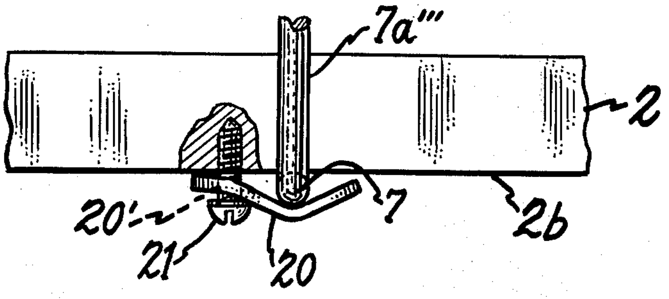
FIG. 9 is a fragmentary plan view of the support base and latching means shown in FIGS. 7 and 8.

A third species of the preferred embodiments of the invention disclosed herein is shown in FIGS. 7–9. Again, like reference numerals are used to identify parts analagous to those shown in FIGS. 1–6. Thus, it will be seen that above a support base 2 there is positioned, in FIG. 7, a ski, which it will be understood rests on blocks such as the blocks 3 and 4 shown in FIG. 4. This embodiment of the invention is particulary adapted for use with cross-country type skis having toe pieces 9*a* and 9*b* having relatively high side portions (e.g. 9*a''*) that may, for example, be one inch or more in height. To enable the latching member 7 to pivot freely so the lugs 7*a''* and 7*b''* (preferably ½ – 1 inch in length) can snuggly engage the toe pieces 9*a* and 9*b* extending beyond the sides of ski 8, the legs comprise, respectively, first substantially straight sections 7*a'''*, 7*b'''* and second substantially straight sections 7*c'*, 7*d'* that are positioned in parallel alignment with one another. The legs also comprise middle segments 7*e'* and 7*f'* disposed generally parallel to the cross bar portion of U-shaped latching member 7. As is apparent in FIG. 7, this arrangement positions the second substantially straight sections 7*c'*, 7*d'* closer to one another than are the first sections 7*a'''*, 7*b'''*.

The cross bar portion of member 7 is secured to a second surface 2*b* of support base 2 that is between the legs of generally U-shaped latching member 7, by a mounting clamp 20 comprising an angular metal bracket that is formed in any suitable manner to partially surround the cross bar portion of member 7, as best seen in FIGS. 8 and 9. The mounting clamp 20 has wall means defining a screw-receiving aperture 20' (FIG. 9) therethrough, and further comprises a screw 21 positioned through the aperture 20' and rotatably secured in the support base 2 through the second surface 2*b* thereof.

In order to accommodate the typical staggered positioning of the toe pieces 9*a* and 9*b* of cross country type skis, as shown in FIG. 7, the mounting clamp 20 is operable to enable the cross bar portion of latching member 7 to pivot to rotate with a twisting movement as depicted by the two phantom positions identified by 7P' and 7P'' in FIG. 8. As best seen in FIG. 9, the single screw 21 used in this preferred embodiment, coupled with the resilience of mounting clamp 20 and its location at substantially the mid portion of the cross bar section of latching member 7 afford such optimum twisting movement. It will be appreciated that other suitable clamping means may be used to secure the latching member 7 for pivotal and twisting movement relative to support base 2, but the preferred embodiments disclosed have been found particularly efficient.

Another important feature of the invention is the use of a pair of rubber sleeves 22 and 23 mounted around the lugs 7*a''* and 7*b''*. These sleeves improve the friction grip of latching means 7 on the binding toe pieces 9*a* and 9*b* and also protect the toe pieces from being marred by the ends of the metal lugs. Of course, vinyl or other suitably resilient material may be used to form such tubes, in given applications of the invention.

Various other modifications and improvements of the invention will be apparent to those skilled in the art, based on the foregoing disclosure. For example, it will be apparent that although the ski supporting surfaces 3' and 4' have been described as being generally flat, in some cases it may be desirable to make such surfaces sufficiently curved to nest rounded or crowned surfaces of the kind found on some modern skis.

In all of these embodiments of the invention shown in FIGS. 1 thru 7, the support bases 2 are preferably between 2½' and 5½' in length and the legs 7*a* and 7*b* of the latching means 7 preferably extend above the upper surface of the support bases 2, when in their respective second positions, a distance that is between 1 to 2½ inches in length less than the distance of the ski supporting surfaces 3' and 4' above the support base 2. With this arrangement, an appreciable manual force is required to bend a ski 8 toward the support base 2 sufficiently to enable the latching means 7 to engage with the toe holder 9 (as shown in FIG. 1) or the bindings 9*a* and 9*b* extending from the side of the skis (as shown in FIG 3); accordingly, when the ski is latched in position and the initial manual pressure relaxed, maintenance operations may be performed without causing the ski to move relative to base 2.

Those skilled in the art will understand that various modifications and improvements may be made in the invention, based upon the teaching of it given above with reference to the Figures herein; accordingly, it is my intention to define the true limits and scope of the invention in the following claims.

I claim:

1. A ski clamping apparatus for holding a ski in position to facilitate scraping and waxing thereof comprising an oblong support base, a first block and a second block, said blocks being mounted in fixed position respectively adjacent the extreme opposite ends of said base with predetermined portions of the blocks extending upward from one surface of the support base, the predetermined portion of each of said blocks extending upward from the support base being shaped to define a generally flat ski supporting surfact at its uppermost extremity, said generally flat ski supporting surfaces together being operable to support a ski thereon above the support base, a latching means pivotally mounted on the support base to pivot relative to said surface of the support based adjacent the mid-point thereof for engaging a portion of a ski binding on a ski supported on said blocks and for holding the ski in tension bent against its camber on the generally flat surfaces of said blocks, said latching means being pivotable from a first position adjacent said surface on the support base to a second position wherein it is operable to engage a portion of a ski binding on a ski supported on said blocks thereby to hold the ski on the generally flat surfaces of said blocks.

2. An apparatus as defined in claim 1 wherein said latching means comprises a generally U-shaped member having a pair of lugs extending respectively outward from the outer ends of the legs thereof in substantially the same plane occupied by said legs, and a pair of mounting brackets rigidly mounted on opposite sides of the support base, said mounting brackets each including wall means defining a recess for receiving one of said lugs therein, each of said lugs being positioned respectively in one of said recesses for pivotal movement therein relative to the support base.

3. An apparatus as defined in claim 2 wherein said U-shaped member is formed of steel stock having sufficient resilience to hold the lugs in said recesses during normal operation of the apparatus and to allow the lugs to be readily removed from the recesses by manually effected compression of the legs of the U-shaped member toward one another.

4. An apparatus as defined in claim 3 wherein the cross bar portion of said generally U-shaped latching member has a center part that is curved toward the mouth of the U-shaped member thereby to position said center part in a range between ¼ and ½ closer to the mouth of the U-shaped member than are the base ends of the legs of the U-shaped member.

5. An apparatus as defined in claim 1 wherein said latching means comprises a generally U-shaped member having a first and second integral lug extending respectively from the outer ends of the legs thereof in a direction generally perpendicular to the plane occupied by said legs, and a pair of mounting eyes securely mounted on opposite sides of the support base, each of said mounting eyes having positioned therethrough a portion of the central part of the U-shaped member to secure it for pivotal movement therein, each of said lugs being operable to slidably engage the ski binding of a ski positioned on said blocks thereby to latch it snuggly against the blocks.

6. An apparatus as defined in claim 4 wherein each of said lugs extends from the outer ends of the legs of the U-shaped member in a direction generally perpendicular to the plane occupied by said legs but at an angle to said plane of approximately 70°.

7. An apparatus as defined in claim 5 wherein said mounting eyes each comprise a piece of steel stock having a pair of spaced-apart apertures formed therein, a first and a second screw being positioned respectively through one of the apertures in each of said eyes and being fastened into the support base, thereby to secure the mounting eyes to the base.

8. An apparatus as defined in claim 5 wherein said mounting eyes are pivotally mounted on the support base thereby to enable the cross bar portion of the latch member positioned therethrough to be moved in a twisting motion relative to the longitudinal axis of the support base, such twisting motion of the cross bar portion of member 7 being effective to align said lugs to fully engage toe plates mounted in longitudinally staggered positions respectively on opposite sides of a ski position on said ski supporting surfaces.

9. An apparatus as defined in claim 5 including a first and second flexible sleeve mounted respectively over said first and second integral lugs to substantially surround the outermost ends thereof.

10. An apparatus as defined in claim 8 wherein said lugs are each in the range of ½ to 1 inch in length.

11. An apparatus as defined in claim 1 wherein said latching means comprises a generally U-shaped member having a substantially straight cross bar portion and leg portions that each include first and second substantially straight sections positioned in parallel alignment with a segment of the middle of each leg disposed generally parallel to the cross bar portion, said second substantially straight sections being positioned closer to one another than are said first straight sections, and wherein said legs each have an integral lug extending from the outer end thereof in a direction generally perpendicular to the plane occupied by said legs, in combination with a mounting clamp secured to the support base, said clamp being positioned at least partly around said cross bar portion of the latching member to hold it for pivotal movement adjacent the support base, each of said lugs being operable to slidably engage toe pieces of a ski binding extending respectively from opposite sides of a ski positioned on said blocks thereby to latch the ski snuggly against the blocks.

12. An apparatus as defined in claim 11 wherein said mounting clamp comprises an angular metal bracket formed to partially surround the cross bar portion of the latching member at its mid point, wall means defining a screw-receiving aperture through one end of said bracket, and a screw positioned through said aperture in the bracket and rotatably secured in a second surface of said support base to hold the cross bar portion of the latching member against said second surface.

13. An apparatus as defined in claim 12 wherein said second surface of said support base receiving the bracket-securing screw is positioned between the legs of the U-shaped latching member.

14. An apparatus as defined in claim 13 wherein said cross bar portion of the latching member is pivotal relative to the longitudinal axis of the support base thereby to enable the cross bar portion to be moved in a twisting motion relative to said longitudinal axis.

15. An apparatus as defined in claim 14 including a pair of rubber tubes mounted respectively around said lugs.

16. A ski clamping apparatus for holding a ski in position to facilitate scraping and waxing thereof comprising an oblong support base, a first block and a second block, said blocks being mounted in fixed position respectively adjacent the extreme opposite ends of said base with predetermined portions of the blocks extending upward from one surface of the support base, the predetermined portion of each of said blocks extending upward from the support base being shaped to define a generally flat ski supporting surface at its uppermost extremity, said generally flat ski supporting surfaces together being operable to support a ski thereon above the support base, a latching means pivotally mounted on the support base to pivot relative to said surface of the support base adjacent the mid-point thereof, said latching means being pivotable from a first position adjacent said surface on the support base to a second position wherein it is operable to engage a portion of a ski binding on a ski supported on said blocks thereby to hold the ski on the generally flat surfaces of said blocks, said latching means comprising a generally U-shaped member having a pair of lugs extending respectively outward from the outer ends of the legs thereof in substantially the same plane occupied by said legs, and a pair of mounting brackets rigidly mounted on opposite sides of the support base, said mounting brackets each including wall menas defining a recess for receiving one of said lugs therein, each of said lugs being positioned respectively in one of said recesses for pivotal movement therein relative to the support base.

* * * * *